United States Patent
O'Connell et al.

(10) Patent No.: US 10,574,719 B2
(45) Date of Patent: *Feb. 25, 2020

(54) AGGREGATING STREAMS MATCHING A QUERY INTO A SINGLE VIRTUAL STREAM

(71) Applicant: EMC IP Holding Company LLC, Hopkinton, MA (US)

(72) Inventors: Mark A. O'Connell, Westborough, MA (US); Stephen Graham, Chapel Hill, NC (US); Dominique Prunier, Montreal (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/259,369

(22) Filed: Jan. 28, 2019

(65) Prior Publication Data

US 2019/0158563 A1 May 23, 2019

Related U.S. Application Data

(63) Continuation of application No. 15/380,036, filed on Dec. 15, 2016, now Pat. No. 10,250,662.

(51) Int. Cl.
*H04L 29/06* (2006.01)

(52) U.S. Cl.
CPC ........ *H04L 65/607* (2013.01); *H04L 65/4069* (2013.01); *H04L 67/42* (2013.01)

(58) Field of Classification Search
CPC .... H04L 65/607; H04L 65/4069; H04L 67/42
See application file for complete search history.

(56) References Cited

U.S. PATENT DOCUMENTS

| | | | |
|---|---|---|---|
| 8,612,307 B2 | 12/2013 | Smith | G06Q 10/00 705/26.1 |
| 8,656,046 B2 | 2/2014 | Barger | G06F 17/27 370/465 |
| 9,633,076 B1 | 4/2017 | Morton | G06F 17/30466 |
| 2008/0060034 A1 | 3/2008 | Egnal | G01C 11/02 725/105 |
| 2011/0137942 A1 | 6/2011 | Yan | G06F 17/30516 707/780 |
| 2012/0054172 A1 | 3/2012 | Agrawal | H04W 4/18 707/713 |
| 2014/0225743 A1 | 8/2014 | Kuroiwa | H04L 12/2825 340/870.02 |
| 2017/0149713 A1 | 5/2017 | Bastide | H04L 51/16 |
| 2017/0185786 A1 | 6/2017 | Ylinen | H04L 63/105 |

(Continued)

*Primary Examiner* — Mohamed A. Wasel
(74) *Attorney, Agent, or Firm* — Womble Bond Dickinson (US) LLP

(57) ABSTRACT

Systems and methods are disclosed for a streaming service generating an aggregation of data streams in response to a query from a client device for data streams matching the query. The aggregation of data streams matching the query is presented to the requesting client as a single virtual stream. The streaming service modifies the virtual stream in real-time by adding data streams matching the query that come online to the virtual stream, or deleting data streams from the virtual stream that go offline. The streaming service can partition the virtual stream if the data flow rate increases above a threshold, and reduce partitions if the data flow rate falls below a threshold. The client device can add or terminate consumer processes in response to changes in the data flow rate and partitioning.

18 Claims, 9 Drawing Sheets

(56) References Cited

U.S. PATENT DOCUMENTS

| | | | |
|---|---|---|---|
| 2017/0311053 A1 | 10/2017 | Ganjam | G06K 9/00671 |
| 2018/0144744 A1 | 5/2018 | Badarinath | G10L 15/22 |
| 2018/0146034 A1 | 5/2018 | Lintner | H04L 67/1034 |

AGGREGATING STREAMS MATCHING A QUERY INTO A SINGLE VIRTUAL STREAM

RELATED APPLICATION

This application is a continuation application of U.S. patent application Ser. No. 15/380,036, filed Dec. 15, 2016, which is incorporated by reference in its entirety.

TECHNICAL FIELD

This disclosure relates to the field of efficiently providing streams of data to a client device.

BACKGROUND

A stream is a sequence of data elements made available over time. A video stream, for example, can comprise a sequence of video data elements made available to a device for viewing the video in an ordered, time-sequenced manner. A client device can request one or more streams from one or more sources. A video stream with an audio stream, for example, may be requested by a client device. The client device then processes the one or more streams as separate streams.

In a more complex example, a client device may want to monitor sensors of a facility, such as motion, heat, doors, alarms, etc. The client device can receive a stream for each sensor in the facility, and process each sensor device as a separate stream. If a new sensor comes online at the facility, the client device may have no way of detecting the presence of the data stream of the new sensor. If the aggregate sensor data for all monitored sensors suddenly increases, such as due to an emergency, as a fire, each sensor monitor process of the client will have to separately decide to increase a number of consumer processes to process the increased sensor data. Separate stream processing of the prior art is not easily scalable, either scaled up or scaled down, in an aggregate fashion. Separate stream processing of the prior art also does not detect new streams coming online that a client device should monitor, or existing sensors going offline that a client device should stop monitoring. Stream processing systems of the prior art also do not aggregate streams matching a client query into a single virtual stream that is easily scaled-in or scaled-out, on demand.

BRIEF DESCRIPTION OF THE DRAWINGS

Embodiments of the invention are illustrated by way of example, and not by way of limitation, in the figures of the accompanying drawings in which like reference numerals refer to similar elements.

In the following description of the figures, the inventive concepts herein have been described with respect to an aggregate stream processing system in which streams are collected at a cluster of nodes. However, the disclosure is not to be construed as limited to a cluster of nodes. A single server can monitor a plurality of streams to be queried and aggregated on demand by one or more client devices.

DETAILED DESCRIPTION

Figure 1:
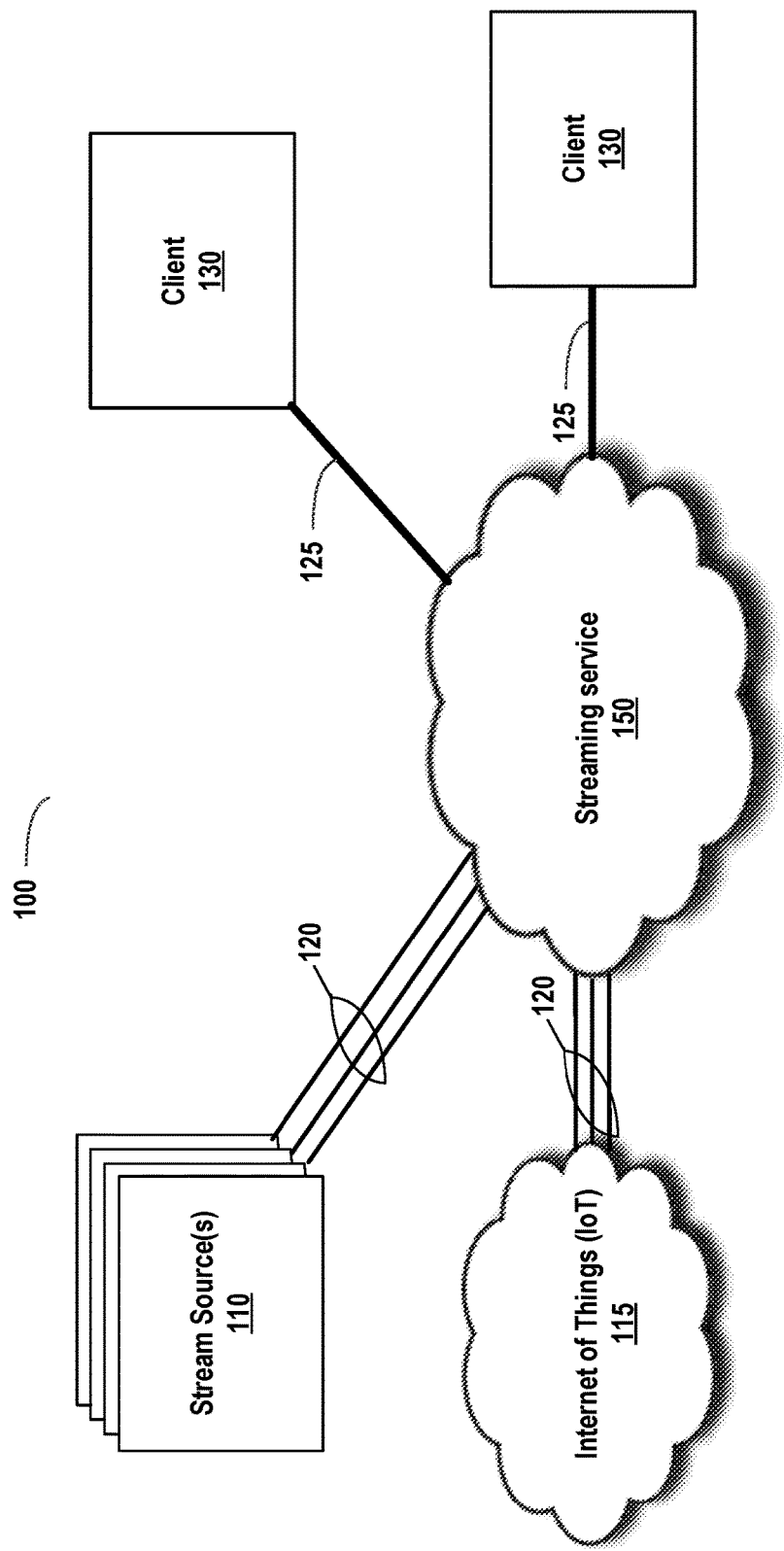
FIG. 1 illustrates, in block diagram form, an overview of an infrastructure for aggregating a plurality of data streams into a single virtual stream for consumption by one or more client devices, in accordance with some embodiments.

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are described for a streaming service generating a virtual stream in response to receiving a query from a client device for one or more data streams that match the query. The streaming service can receive the query and access a database of data streams to determine a plurality of data streams active on the streaming service that match the query received from a client device. The streaming service can aggregate the matching data streams into a virtual stream comprising data received from the plurality of data streams. The streaming service can transmit, to the client device, a handle or unique identifier for the virtual stream together with one or more routing keys that client consumer processes can use to access one or more segments of data of the virtual stream. In an embodiment, the streaming service can monitor the data streams active on the streaming service to determine changes in flow rate of each data stream, and determine whether a data stream has become inactive. The streaming service can drop inactive data streams from the virtual stream. The streaming service can further determine whether a new data stream matching the query has become active and add new active data streams matching the query to the virtual stream. In an embodiment, the streaming service can determine whether a data stream has increased or decreased data flow rate for the data stream by more than a threshold amount. The streaming service can suggest to the client device that the client device add, or delete, a data stream consumer process if the flow rate for a particular data stream has increased or decreased more than a threshold amount. Similarly, if the data flow rate for the virtual stream, which comprises an aggregate of the data streams that match the client query, has increased or decreased data more than a threshold amount, the streaming service can suggest that the client device add, or delete, one or more virtual stream consumer processes. In an embodiment, the streaming service can pause and optionally buffer, the virtual stream in response to receiving a pause command from the client device. The streaming service can close the virtual stream in response to the receiving a close virtual stream command from the client device, or in response to determining that the client device is no longer responding to streaming service In an embodiment, a client device can transmit a query to a streaming service to build a virtual stream from data streams that match the client device query and that are accessible by the streaming service. In response to the query, the client device can receive a handle or unique identifier together with a set of routing keys from the streaming service with which the client device can access the virtual stream. In an embodiment, the client device can receive a reconfiguration message from the streaming service, containing a suggestion that the client device generate, or terminate, one or more virtual stream consumer processes. In response to receiving the message, the client device can reconfigure the virtual stream consumer processes associated with the virtual stream. In an embodiment, the client device can send a "close stream" message to the streaming service, indicating that the streaming service should terminate the virtual stream associated with the client device query.

Any of the methods described herein can be embodied on a non-transitory computer-readable medium programmed with executable instructions that, when executed, perform the method. A system can be programmed with executable instructions that, when executed by a processing system, can perform any of the above methods.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code. At least certain embodiments include an environment with a calling software component interacting with a called software component through an API. A method for operating through an API in this environment includes transferring one or more function calls, messages, other types of invocations or parameters via the API.

FIG. 1 is a block diagram illustrating an overview of an infrastructure 100 for aggregating a plurality of data streams 120 into a virtual stream 125 for consumption by one or more client devices 130, in accordance with some embodiments.

A streaming service 150 can receive streams 120 from stream sources 110 and from, e.g. Internet of Things (IoT) 115. As defined above, a stream is a sequence of data elements made available over time. A stream source can include, but is not limited to, a video or audio stream, an output stream from a computing device such as backup data or computer operation status statistics, data output from a sensor or collection of sensors such as heat, light, temperature, and door sensors, alarms systems, position or vehicle status data (e.g. smog emissions data, engine temperature, battery charge, speed information) from an automated driving, or conventional, vehicle, a radio stream, including data streamed from a cell phone, smart phone, or other personal digital device. A stream can include data elements output from a network of devices (Internet of Things), such as devices from a home, business, or a manufacturing facility, including one or more appliance or machinery status outputs, lighting controls status outputs, alarm system monitoring outputs, video surveillance data, and numerous other data sources.

Streaming service 150 can receive data streams 120 and provision a session for each data stream 120. Provisioning can include allocating memory and processor resources, and storage for the receipt, buffering, storage, processing and transmission of data received from the data stream 120. Streaming service 150 can generate an entry in a stream database 185 identifying the data stream 120, including a handle or unique identifier and a set of routing keys, and attributes generated from data and/or metadata of the stream. In an embodiment, stream data base 185 can include a security component that enforces which users are authorized to read from a stream 120.

A client device 130 can query streaming service 150 for data streams 120 that match a query. For example, a client device 130 may want to monitor all data streams 120 at facility A. Client device 130 can issue a query to streaming service 150 to build a virtual stream 125 that matches the query. Streaming service 150 can access a database of data streams 120, and build a single virtual stream 125 using the data streams 120 that match the query. Streaming service 125 can then send a handle or unique identifier and a set of routing keys, or other access mechanism to client device 130 so that client device 130 can access the virtual stream 125 built for the query. Similarly, another client device 130 may want monitor data streams 120 for a particular brand and model of sensor devices in both facility A and facility B. Streaming service 150 can again access the database of data streams 120 to determine data streams 120 that match the query of the another client device 130 and build a single virtual stream 125 for the another client device 130 that matches the query. In this example, there may be an overlap in the data streams 120 that make up the virtual streams 125 as between the two example queries. Each virtual stream 125 that uses a data stream 120 can increment an instance counter of usage of the data stream 120.

A client device 130 can be any type of client such as a personal computer (e.g., desktops, laptops, and tablets), a workstation, a handheld device, a Web-enabled appliance, a gaming device, a media player, a mobile phone (e.g., Smartphone), a virtual machine, a virtual machine host, a server, or any computing system operable to communicate over a storage area network 120. An exemplary client device 130 is described below with reference to FIG. 9.

Figure 2:
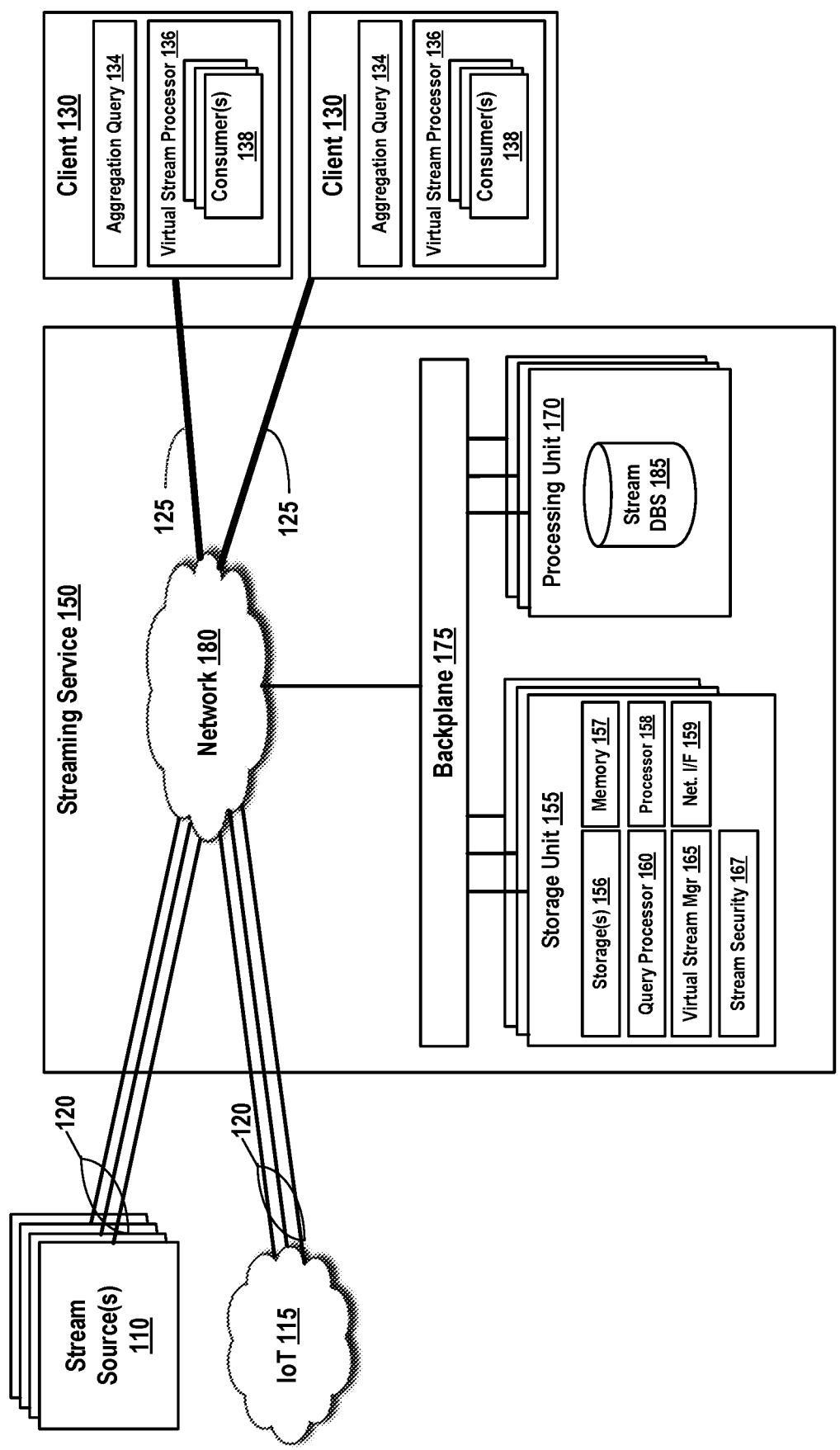
FIG. 2 illustrates, in block diagram form, a detailed view of an infrastructure for aggregating a plurality of data streams into a single virtual stream for consumption by one or more client devices, in accordance with some embodiments.

FIG. 2 illustrates, in block diagram form, a detailed view of an infrastructure 100 for a streaming service 150 to aggregate a plurality of data streams 120 into a virtual stream 125 for consumption by a client device 130, in response to a query, in accordance with some embodiments.

A streaming service 150 can include a network 180 that interconnects the streaming service 150 components with stream sources 110, IoT 115, data streams 120 and virtual streams 125 to client devices 130. Network 180 can be any type of network including Ethernet, Fibre Channel, Fire Wire, USB, token ring, cellular network, or other networking technology.

Streaming service 150 components can include a backplane 175, storage unit(s) 155, and processing unit(s) 170. A backplane 175 can comprise a high speed I/O bus, a fiber optic network, or other high speed interconnection system. A backplane 175 can further include hardware processor(s), memory, communication interfaces, and I/O channels for interfacing to storage unit(s) 155 and processing unit(s) 170. Storage unit(s) 155 can each include one or more storages 156, memory 157, one or more processors 157, including at least one hardware processor, a networking interface 159, a query processor 160, a virtual stream manager 165, and a stream security module 167. Processors 158 can be general purpose or special purpose CPUs, such as a GPU, math co-processor, digital signal processor (DSP), or other special purpose processor type. Processors can be parallel processors, pipelined processors, multi-core processors, or other processor architecture. Memory 157 can include dynamic RAM, static RAM, read-only memory (ROM), flash memory, or other memory types. Memory 157 can store instructions that, when executed by one or more hardware CPUs, implement a streaming service 150 that aggregates data streams 120 into a single virtual stream 125 in response to receipt of a query by a client device 130 for data streams 120 that match the query.

Query processor 160 can receive a query from a client device 130 to generate a virtual stream 125 from one or more data streams 120 that match the query criteria. The query can include client device 130 identifying information, user information of the client device 130 such that a stream security module 167 can determine whether a user and/or client device 130 is permitted to access a data stream that matches the query. Query processor 160 can access stream database 185 in processing unit(s) 170 to determine data streams 120 that match the query. In an embodiment, stream database 185 can be located in storage 156 of storage unit 155. Storage unit(s) 155 can provide scale-out architecture such that adding another storage unit 155 also adds memory and processing capacity. Processing unit(s) 170 can include all elements of a storage unit 155, and may further include a stream database 185. Processing unit 170 can include logic that enables processing unit 170 to be used to supplement processing performed by storage units 155.

Stream database 185 can store a record of each data stream 120 that is currently active on the streaming service 150. A data stream 120 is active on the streaming service 150 if the streaming service 150 receives at least one data element from the data stream 120 within a predetermined window of time, e.g. 1 second, 1 minute, 1 hour, or 1 day. A predetermined window of time can be individually set for each data stream 120. Receipt, or non-receipt, of a data element within the predetermined window of time for the data stream 120 can be used to indicate whether an active data stream 120 has timed-out become inactive. Receipt of a data element from a data stream 120 can indicate that an inactive data stream 120 has become active. In an embodiment, stream database 185 can further include a record for each data stream 120 that has been active on the streaming service 150. A record of a data stream 120 can include information about the data stream 120 that can be used to match the data stream 120 to a client device 130 for a virtual stream 125. Information about the data stream 120 can include metadata describing attributes of the data stream, such as a make/model of the device generating the data, a location of the device generating the data, an owner of the device generating the data, a type of the data (binary, text, etc.), uses for the data, content of the data, and the like. Stream database 185 can further include a record for each virtual stream 125 that is generated in response to a query received from a client device 130. The virtual stream 125 database record can include information about the requesting client device 130 or user, security information about the client device 130 or user, a time the query was received, an average data flow rate for the virtual stream 125, a number of data streams 120 that make up the virtual stream 125, a handle or unique identifier for the virtual stream 125, and other data about the virtual stream 125.

Virtual stream manager 165 can build a virtual stream 125 from one or more data streams 120 that match the query received from a client device 130 by the query processor 160. When the virtual stream 125 is ready for presentation to the requesting client device 130, virtual stream manager 165 can pass a handle or unique identifier and a set of routing keys to the client device 130 so that the client device 130 may consume the virtual stream 125. In an embodiment, a virtual stream 125 comprises only active data streams 120. If a data stream 120 matching the query becomes active on the streaming service 150, virtual stream manager 165 can add the newly active data stream 120 one or more virtual streams 125 for which the newly active data stream 120 matches the query used to generate the virtual stream 125. If an active data stream 120 stops being active (is inactive), the newly inactive data stream 120 can be removed from any virtual streams 125 of which the newly inactive data stream 120 was a member, by the virtual stream manager 165.

When a newly active data stream 120 is added to one or more virtual streams 125, then virtual stream manager 165 can notify any client device 130 consuming the one or more virtual streams 125 that the newly active data stream 120 has been added to a virtual stream 125 that the client is consuming, and suggest to the client device 130 to add a consumer process at the client device 130. Similarly, when an active data stream 120 becomes inactive, virtual stream manager 165 can notify any client device 130 consuming a virtual stream 125 of which the now-inactive data stream 120 was a part, and suggest that the client device 130 terminate one or more consumer processes 138 pm the client device 130.

In an embodiment, virtual stream manager 165 can monitor the data flow rate of individual data streams 120 that make up a virtual stream 125. Virtual stream manager 165 can send a notification to any client devices 130 consuming a virtual stream 125 that a data stream 120 within the virtual stream 125 has increased, or decreased, data flow rate more than a threshold amount and recommend that the consuming client device 130 add, or delete, one or more consumer processes 138 associated with the virtual stream 125. Similarly, virtual stream manager 165 can monitor the combined data flow rate of all data streams 120 in the virtual stream 125 and send a notification to a client device 130 consuming the virtual stream 125 that the virtual stream 125 data flow rate has increased, or decreased, more than a threshold amount, and recommend that the client device 130 add, or delete, one or more consumer processes 138 associated with the virtual stream 125. On receipt of a message from a client device 130 to stop a virtual stream 125, virtual stream manager 165 can terminate the virtual stream 125 and release any resources, such as memory and processes, allocated to processing the virtual stream 125. On receipt of a message from the client device 130 to pause the virtual stream 125, virtual stream manager 165 can buffer data from the data streams 120 that make up the virtual stream 125 and resume streaming of the virtual stream 125 on receipt of an "resume" command from the client device 130. Virtual stream manager 165 may buffer a fixed amount of data, up to a resource limit, and then discard data which overflows the buffer. Data may be discarded, e.g., on a first-in-first-out.

Client device 130 can include an aggregation query module 134 and a virtual stream processor module 136. Aggregation query module 134 can generate and transmit a query to streaming service 150 to build a virtual stream 125 for the client device 130. The virtual stream 125 can comprise one or more data streams 120 that match the query criteria. The one or more data streams 120 can be aggregated by the virtual stream manager 165 and presented to the client device 130 as a single virtual stream 125. The client device 130 can include a virtual stream processor 136 that receives and processes the virtual stream 125. Virtual stream processor 136 can instantiate one or more consumer processes 138 that consume the data streams 120 within the virtual stream 125. Virtual stream processor 136 can instantiate additional consumers processes 138, or terminate consumer processes 138, as suggested by messages from virtual stream manager 165 in response to virtual stream manager 165 monitoring of data flow rate and number of data streams in a virtual stream 125. Virtual stream processor 136 can also receive and process messages from virtual stream manager 165, such as pause, resume, and stop virtual stream 125.

Figure 3:
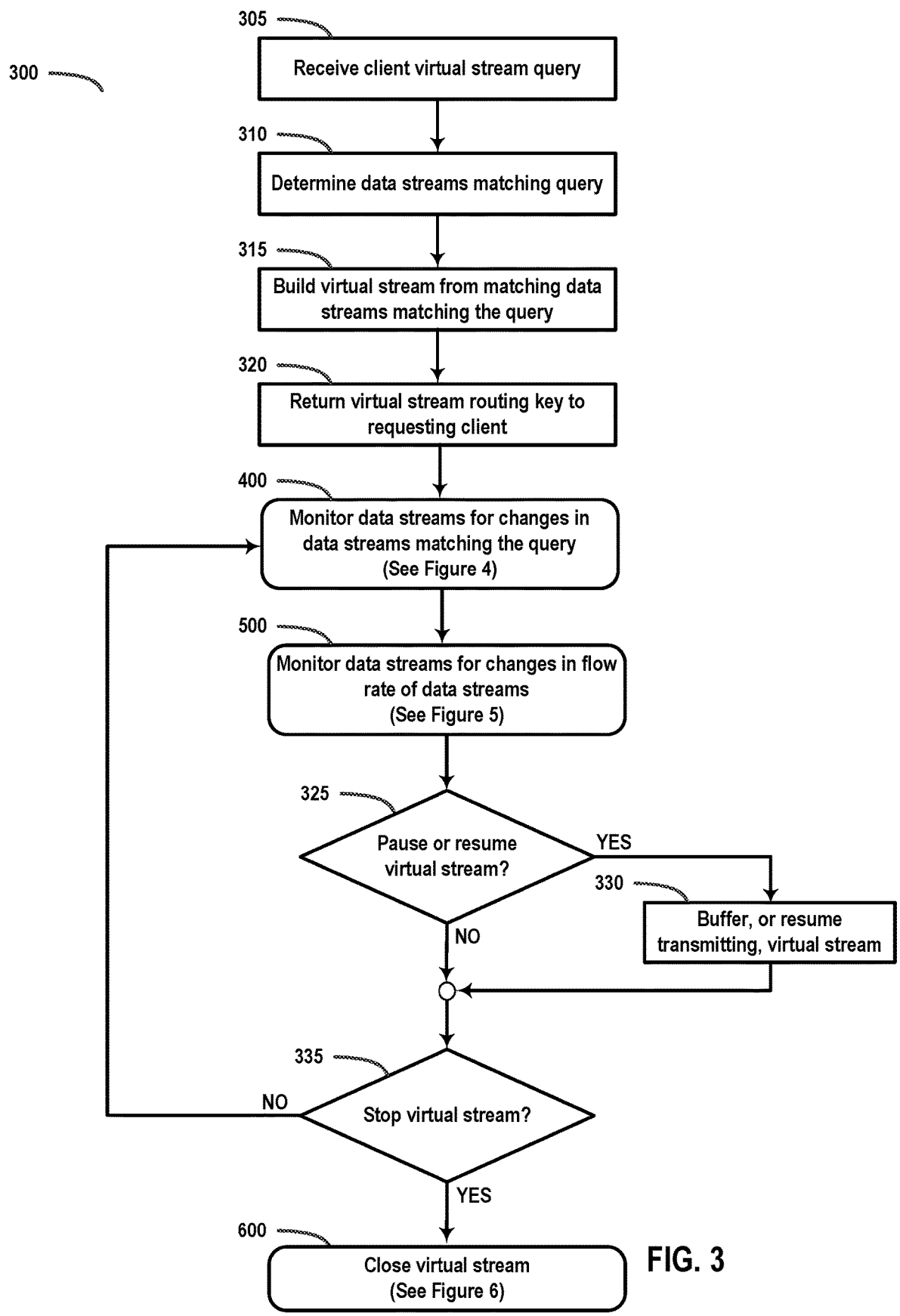
FIG. 3 illustrates a method of a streaming service receiving a query from a client device data streams matching the query and generating a virtual stream as a scalable aggregate of data streams matching the query, in accordance with some embodiments.

FIG. 3 illustrates a method 300 of a streaming service 150 receiving a query from a client device 130 for a virtual stream 125 comprising an aggregation of data streams 120 that match the query, in accordance with some embodiments.

In operation 305, streaming service 150 query processor 160 can receive a query from a client device 130 aggregation query module 134 for a virtual stream 125 comprising data streams 120 matching the query criteria.

In operation 310, streaming service 150 query processor 160 can determine the data streams 120 that match the query received from the client device 130 query. Query processor 160 can parse the query and access one or more data stream 120 records in stream database 185 to determine active data streams 120 that match the query criteria.

In operation 315, virtual stream manager 165 can aggregate the data streams 120 that match the client device 130 query into a single virtual stream 125. Data streams 120 can be aggregated by time-multiplexing, round-robin turns, or other aggregation technique to provide a single virtual stream 125 comprising the data streams 120 that match the client device 130 query.

In operation 320, virtual stream manager 165 can generate a handle or unique identifier and a set of routing keys ("routing identifiers") and associate the routing identifiers with the virtual data stream 125. Virtual stream manager 165 can then transmit the routing identifiers to the requesting client device 130 so that client device 130 virtual stream processor 136 can process the virtual stream 125.

In operation 400, virtual stream manager 165 can monitor the data streams 120 that make up the virtual stream 125 to determine whether new data streams 120 matching the query have become active, and whether any data streams 120 within the virtual stream 125 have become inactive. Operation 400 is described in detail, below, with reference to FIG. 4.

In operation 500, virtual stream manager 165 can monitor the data streams 120 that make up the virtual stream 125 for changes in flow rate of the individual data streams 120 that make up the virtual stream 125, and the overall flow rate of the virtual stream 125. Operation 500 is described in detail, below, with reference to FIG. 5.

In operation 325, it can be determined whether the virtual stream manager 165 has received a pause or resume command from the client device 130 virtual stream processor 136.

If, in operation 325, the virtual stream manager 165 received a pause or resume command, then in operation 330, the virtual stream manager 165 can process the pause or resume command. If a pause command was received, the virtual stream manager 165 can buffer the virtual stream data. If the resume command was received, the virtual stream manager 165 can resume transmitting virtual stream data to the client device 130.

In operation 335, it can be determined whether the virtual stream manager 165 has received a stop command from the client device 130 virtual stream processor 136. If so, then in operation 600, the virtual stream can be closed. Otherwise method 300 resumes at operation 400. Operation 600 is described in detail, below, with reference to FIG. 6.

Figure 4:
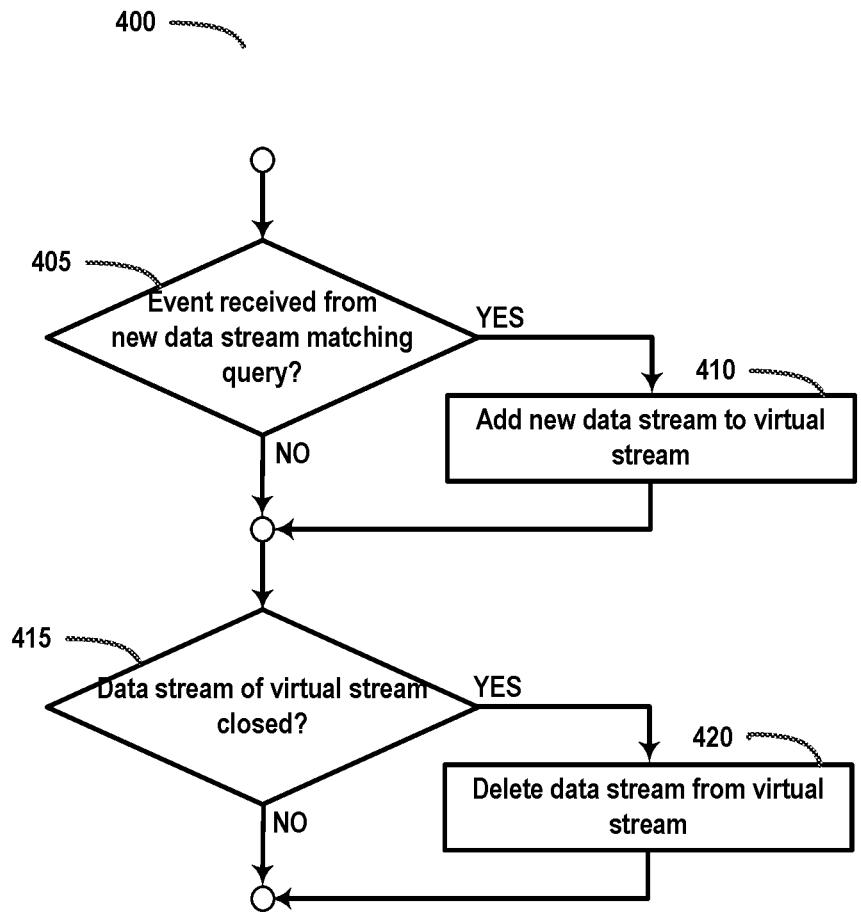
FIG. 4 illustrates a method of monitoring a virtual stream for changes to the data streams that match the client device virtual stream query, in accordance with some embodiments.

FIG. 4 illustrates a method 400 of streaming service 150 monitoring a virtual stream 125 for changes to the data streams 120 that match the client device 130 virtual stream query, in accordance with some embodiments.

In operation 405, it can be determined whether the virtual stream manager 165 detects an event from a new data stream 120 that matches the query. A new data stream is a data stream that is not currently part of the virtual stream 125. A new data stream can be stream that has become active since the virtual stream 125 was created. Virtual stream manager 165 can receive an event that a new data stream 120 has become active on the streaming service 150. Virtual stream manager 165 can access stream database 185 to determine whether the newly active data stream 120 matches the query that generated the virtual stream 125.

If, in operation 405, the virtual stream manager 165 determines that a newly active data stream 120 matches a client device 130 query, then in operation 410 virtual stream manager 165 can add the newly active data stream 120 to the virtual stream 125. In an embodiment, virtual stream manager 165 can send a notification to client device 130 virtual stream processor 136 that the newly active data stream 120 has been added to the virtual stream 125.

In operation 415, it can be determined whether the virtual stream manager 165 detects that an active data stream 120 that is part of a virtual stream 125 has become inactive. A data stream 120 can be deemed inactive if the streaming service 150 receives an explicit message that the data stream 120 is terminating, or if the data stream 120 fails to produce a data element within a specified window of time. The specified window of time can be configured for each data stream, or can be a default window of time or a configured window of time for all data streams 120.

If, in operation 415, the virtual stream manager 165 determines that a data stream 120 that is part of a virtual stream 125 has become inactive, then in operation 420 virtual stream manager 165 can delete the inactive data stream 120 from the virtual stream 125. In an embodiment, virtual stream manager 165 can send a notification to client device 130 virtual stream processor 136 that the inactive data stream 120 has been deleted from the virtual stream 125.

Figure 5:
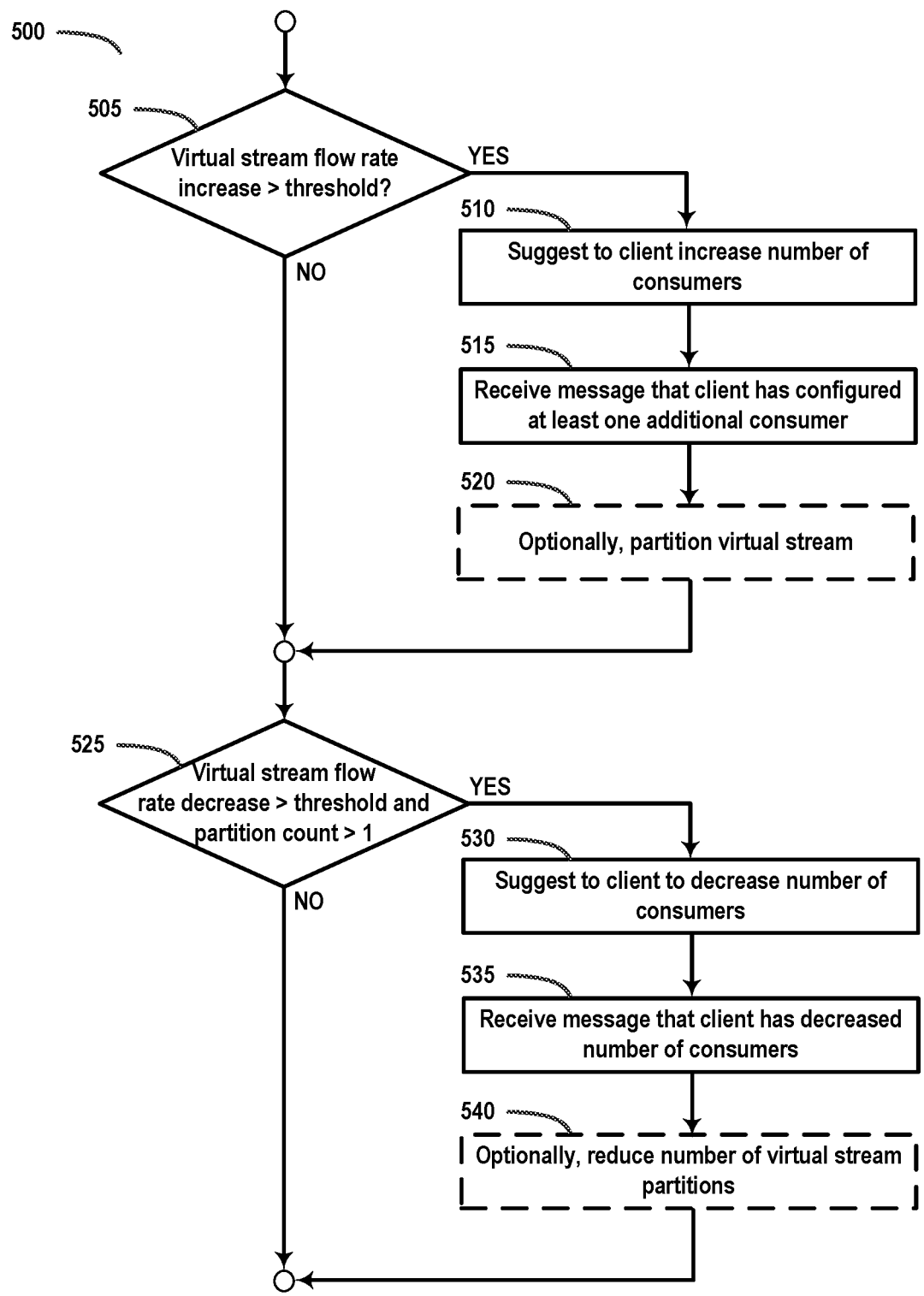
FIG. 5 illustrates a method of monitoring a virtual stream for changes to the flow-rate of data in the virtual stream, and recommending to the querying client device to change the number of consumer processes that consume the virtual stream.

FIG. 5 illustrates method 500 of a streaming service 150 monitoring a virtual stream 125 for changes to the data flow rate in the virtual stream 125, and recommending to the querying client device 130 to change the number of consumer processes 138 that consume the virtual stream 125.

This same method 500 can also be used on a per-data stream 120 basis for suggesting to a client device 130 to add, or delete, a consumer process 138 for a data stream 120 of the virtual stream 125.

In operation 505, virtual stream manager 165 can monitor a data flow rate of virtual stream 125, and the data streams 120 that make up the virtual stream 125, to determine whether a data flow rate for the virtual stream 125 (or a data stream 120) has increased above a threshold amount. In an embodiment, the threshold can be a 25% increase in flow rate.

If, in operation 505 it is determined that the data flow rate of the virtual stream 125 (or a data stream 120 of the virtual stream 125) has increased above a threshold amount, then method 500 continues at operation 510, otherwise method 500 continues at operation 525.

In operation 510, virtual stream manager 165 can send a notification to client device 130 suggesting that virtual stream processor 136 increase a number of consumer processes 138 that are processing the virtual stream 125. If the increase in data flow rate determined in operation 505 is substantially attributable to a single data stream 120 within the virtual stream 125, then virtual stream manager 165 can send a notification to the client device 130 that identifies the data stream 120 within the virtual stream 125 that has the increased data flow rate, and suggest that client device 130 virtual stream processor 136 add one or more consumer processes 138 for the identified data stream 120 having the increased data flow rate.

In operation 515, virtual stream manager 165 can receive a message from client device 130 virtual stream processor 136 that a consumer process 138 has been added for the virtual stream 125, or for a data stream 120 of the virtual stream 125.

In operation 520, virtual stream manager 165 can optionally partition the virtual stream 125 to balance the flow rate of the virtual stream 125 across consumer processes 138. Partitioning the virtual stream 125 can include identifying a first group of data streams 120 of the virtual stream 125 and a second group of data streams 120 of the virtual stream 125, and generate an additional routing identifier of the virtual stream 125. Virtual stream manager 165 can transmit the first and second routing identifiers to the client device 130 virtual stream processor 136 for processing the partitioned virtual stream 125.

In operation 525, virtual stream manager 165 can monitor a data flow rate of virtual stream 125, and the data streams 120 that make up the virtual stream 125, to determine whether a data flow rate for the virtual stream 125 (or a data stream 120) has decreased more than a threshold amount. In an embodiment, the threshold can be a 25% decrease in flow rate.

If, in operation 525 it is determined that the data flow rate of the virtual stream 125 (or a data stream 120 of the virtual stream 125) has decreased more than a threshold amount, then method 500 continues at operation 530, otherwise method 500 ends.

In operation 530, virtual stream manager 165 can send a notification to client device 130 suggesting that virtual stream processor 136 decrease a number of consumer processes 138 that are processing the virtual stream 125. If the decrease in data flow rate determined in operation 525 is substantially attributable to a single data stream 120 within the virtual stream 125, then the notification can identify the data stream 120 having the decreased data flow rate, and suggest that client device 130 virtual stream processor 136 terminate one or more consumer processes 138 for the identified data stream 120 having the decreased data flow rate.

In operation 535, virtual stream manager 165 can receive a message from client device 130 virtual stream processor 136 that a consumer process 138 has been terminated for the virtual stream 125, or for a data stream 120 of the virtual stream 125.

In operation 540, virtual stream manager 165 can optionally reduce a number of partitions of the virtual stream 125 to rebalance the data flow rate of the virtual stream 125 across consumer processes 138. Reducing partitions of the virtual stream 125 can include identifying a first and a second partition of the virtual stream 125 and combining the first and second partitions into a single partition. The single partition can be one of the first or second partitions, and the other partition can be terminated. Virtual stream manager 165 can transmit a notification to the client device 130 virtual stream processor 136 that the first and second partitions have been combined and identify the routing identifier for the combined partition and for the terminated partition.

Figure 6:
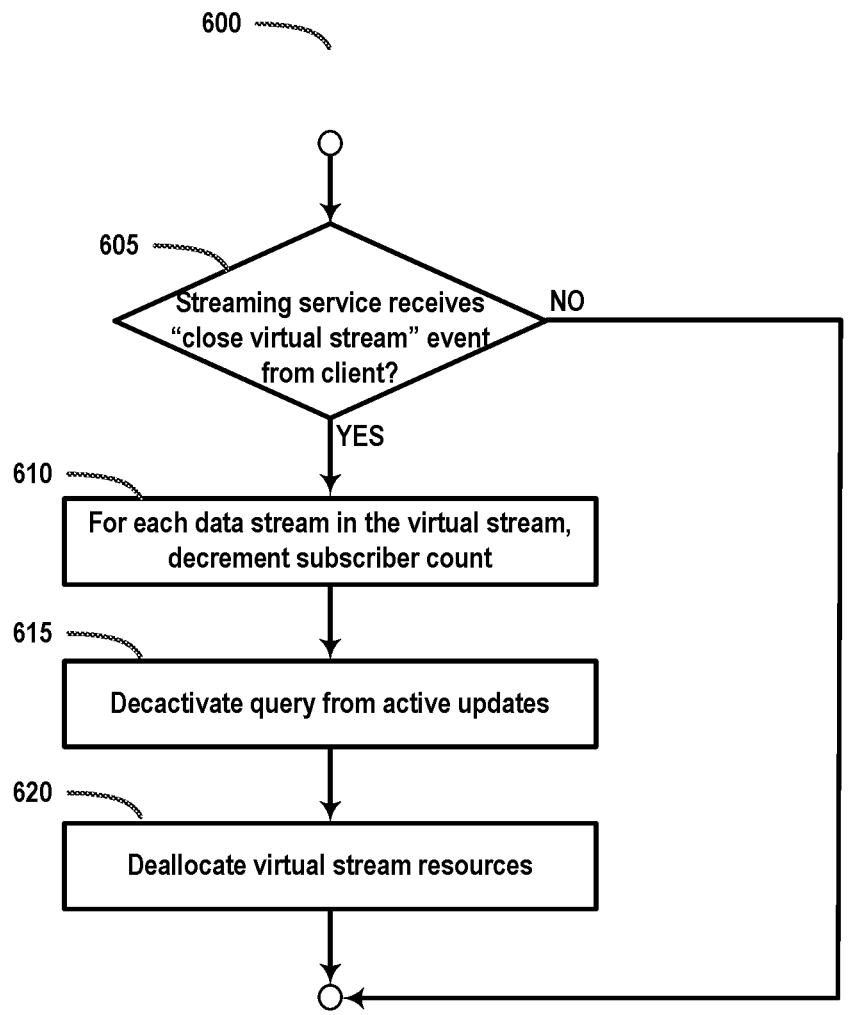
FIG. 6 illustrates a method of closing a virtual stream on request from a client device, in accordance with some embodiments.

FIG. 6 illustrates method 600 of a streaming service 150 closing a virtual stream 125 on request from a client device 130 virtual stream processor 136, in accordance with some embodiments.

In operation 605, streaming service 150 virtual stream manager 165 can determine whether a command to close a virtual stream 125 has been received from a client device 130.

If, in operation 605, it is determined that virtual stream manager 165 has received a close virtual stream 125 command, then method 600 continues at operation 610, otherwise method 600 ends.

In operation 610, for each data stream 120 that makes up the virtual stream 125 to be closed, a subscriber count of the data stream 120 can be decremented. If any data stream 120 within the virtual stream 125 has a zero subscriber count, then resources for processing the data stream 120 can optionally be released.

In operation 615, virtual stream manager 165 can deactivate the client device 130 query that created the virtual stream 125. Virtual stream manager 165 can stop identifying data streams 120 that match the query that created the virtual stream 125.

In operation 620, virtual stream manager 165 can deallocate resources used to support the now-closed virtual stream 125.

Figure 7:
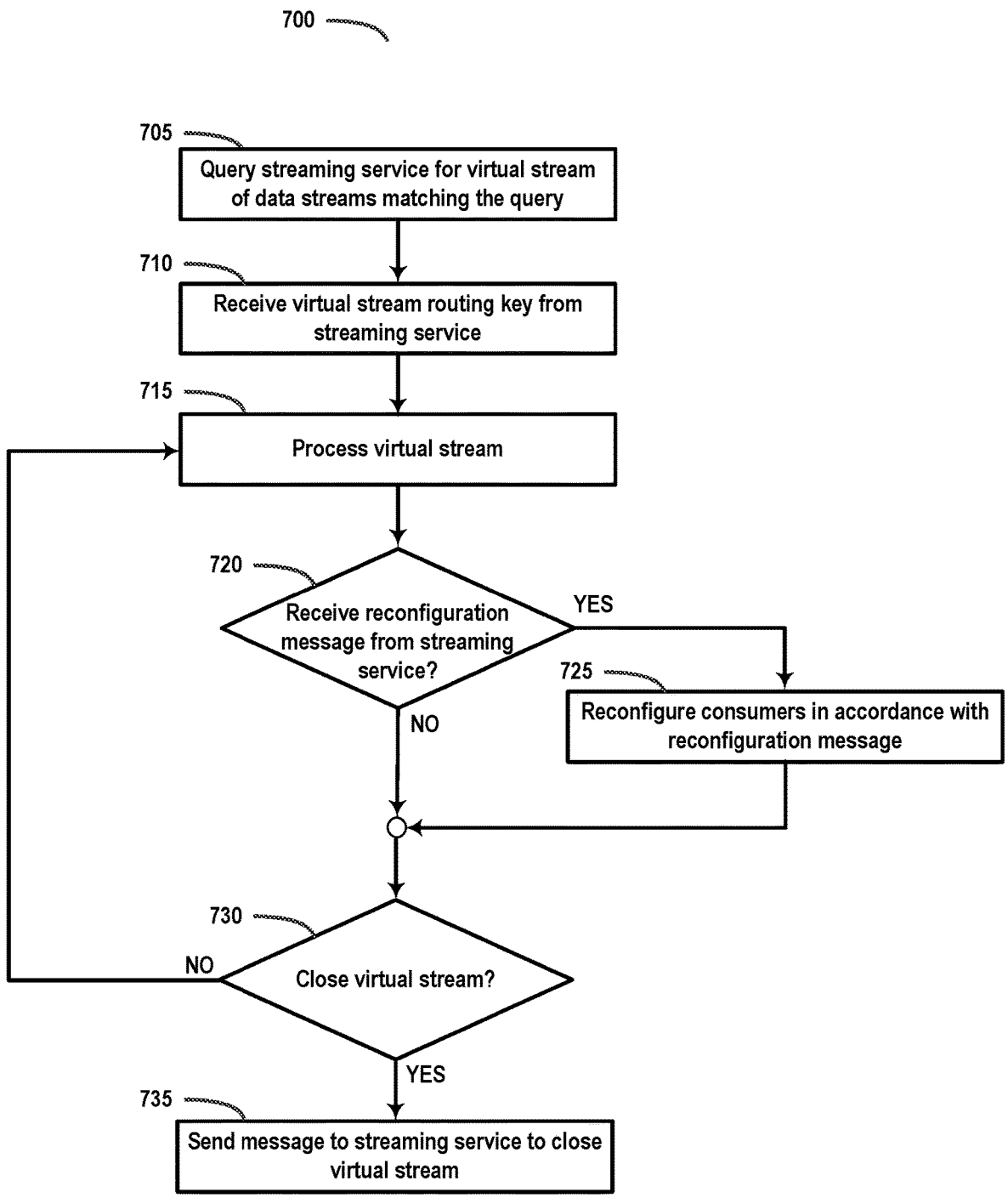
FIG. 7 illustrates a method of a client device processing a virtual stream, in accordance with some embodiments.

FIG. 7 illustrates a method 700 of a client device 130 processing a virtual stream 125, in accordance with some embodiments.

In operation 705, aggregation query module 134 of client device 130 can generate a query to the streaming service 150 to generate a virtual stream 125 that comprises one or more data streams 120 that match the query.

In operation 710, client device 130 virtual stream processor 136 can receive, from streaming service 150 virtual stream manager 165, a handle or unique identifier and a set of routing keys for the virtual stream processor 136 to access and process the virtual stream 125.

In operation 715, virtual stream processor 136 can begin processing the virtual stream 125 using one or more consumer processes 138 that process data streams 120 within the virtual stream 125.

In operation 720, virtual stream processor 136 can determine whether a message from virtual stream processor 165 has been received, indicating that the streaming service 150 has reconfigured the virtual stream 125, or suggested a modification to the number of client device 130 consumer processes 138 for the virtual stream 125. The message can indicate: (1) the virtual stream 125 has been partitioned, (2) the virtual stream partitioning has been reduced, (3) adding, or terminating, a consumer process 138 for the virtual stream 125 is recommended, or (4) adding, or terminating, a consumer process 138 for a particular data stream 120 of the virtual stream 125 is recommended.

If, in operation 720, it is determined that the virtual stream processor 136 has received a reconfiguration message from the streaming service 150 virtual stream manager 165, then method 700 continues at operation 725, otherwise method 700 continues at operation 730.

In operation 725, virtual stream processor 136 can reconfigure virtual stream consumer processes 138 as indicated in the reconfiguration message received in operation 720. If the message indicates that (1) the virtual stream 125 has been partitioned, then the virtual stream processor 136 can extract from the message one or more partition routing identifiers from the message. If the message indicates that (2) the virtual stream 125 partitioning has been reduced, then the virtual stream processor 136 can extract from the message the routing identifier of the reduced virtual stream partition and the virtual stream partition that has been terminated based on the virtual stream partition reduction. If the message indicates (3) adding, or terminating, a consumer process 138 for the virtual stream 125 is recommended, then virtual stream processor 136 can allocate, or terminate, one or more consumer processes 138 in accordance with the message. If the message indicates (4) adding, or terminating, one or more consumer processes 138 for a particular data stream 120 of the virtual stream 125, then virtual stream processor 136 can add, or terminate, one or more consumer processes 138 for the particular data stream 120 of the virtual stream 125.

In operation 730, virtual stream processor 136 can determine whether a process of the client device 130 has requested that the virtual stream 125 be closed. If so, then method 700 continues at operation 735, otherwise method 700 continues at operation 715.

In operation 735, virtual stream processor 138 can transmit a message to streaming service 150 virtual stream manager 165 to close the virtual stream 125. In an embodiment, virtual stream processor 138 can receive a confirmation from the virtual stream manager 165 that the virtual stream 125 is closed, and virtual stream processor 136 can indicate confirmation that the virtual stream 125 is closed, to the client device 130 process that requested closure of the virtual stream 125.

Figure 8:
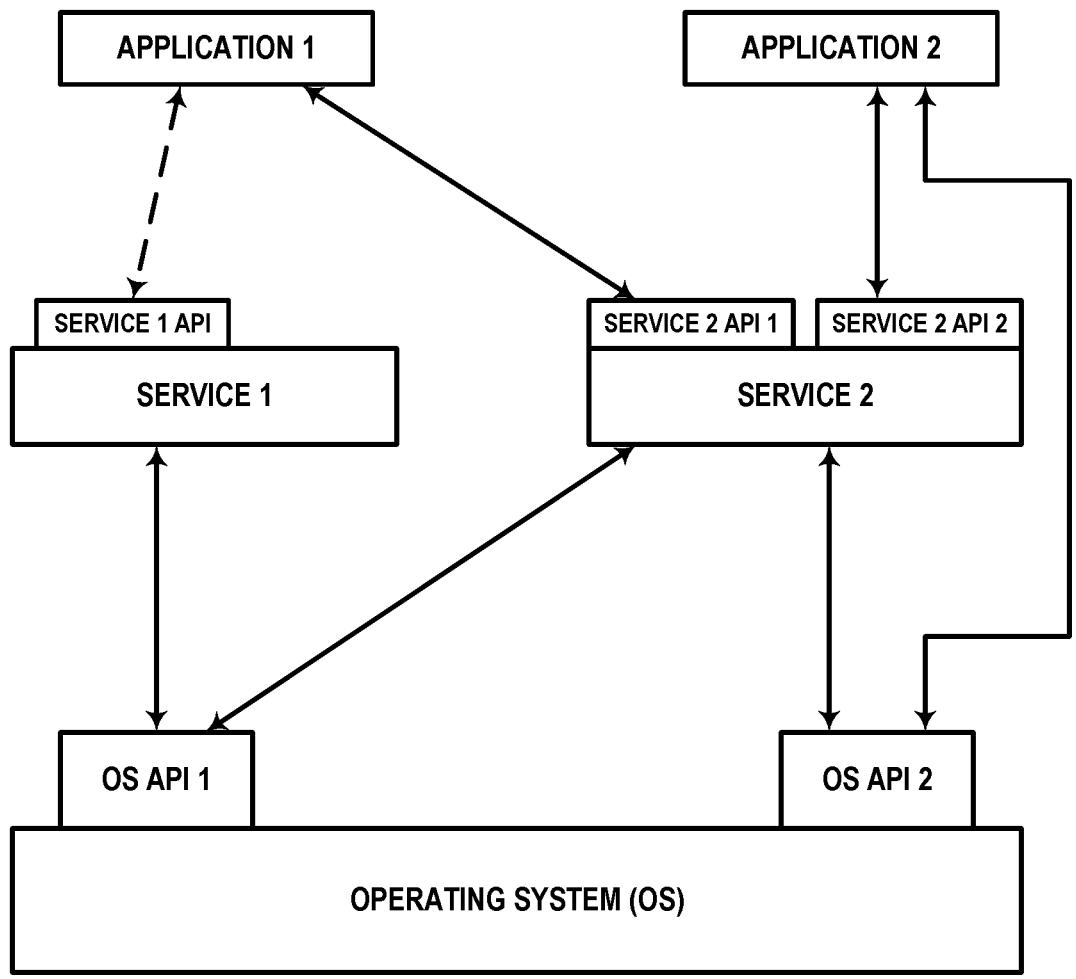
FIG. 8 illustrates an exemplary embodiment of a software stack usable in some embodiments of the invention.

In FIG. 8 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Figure 9:
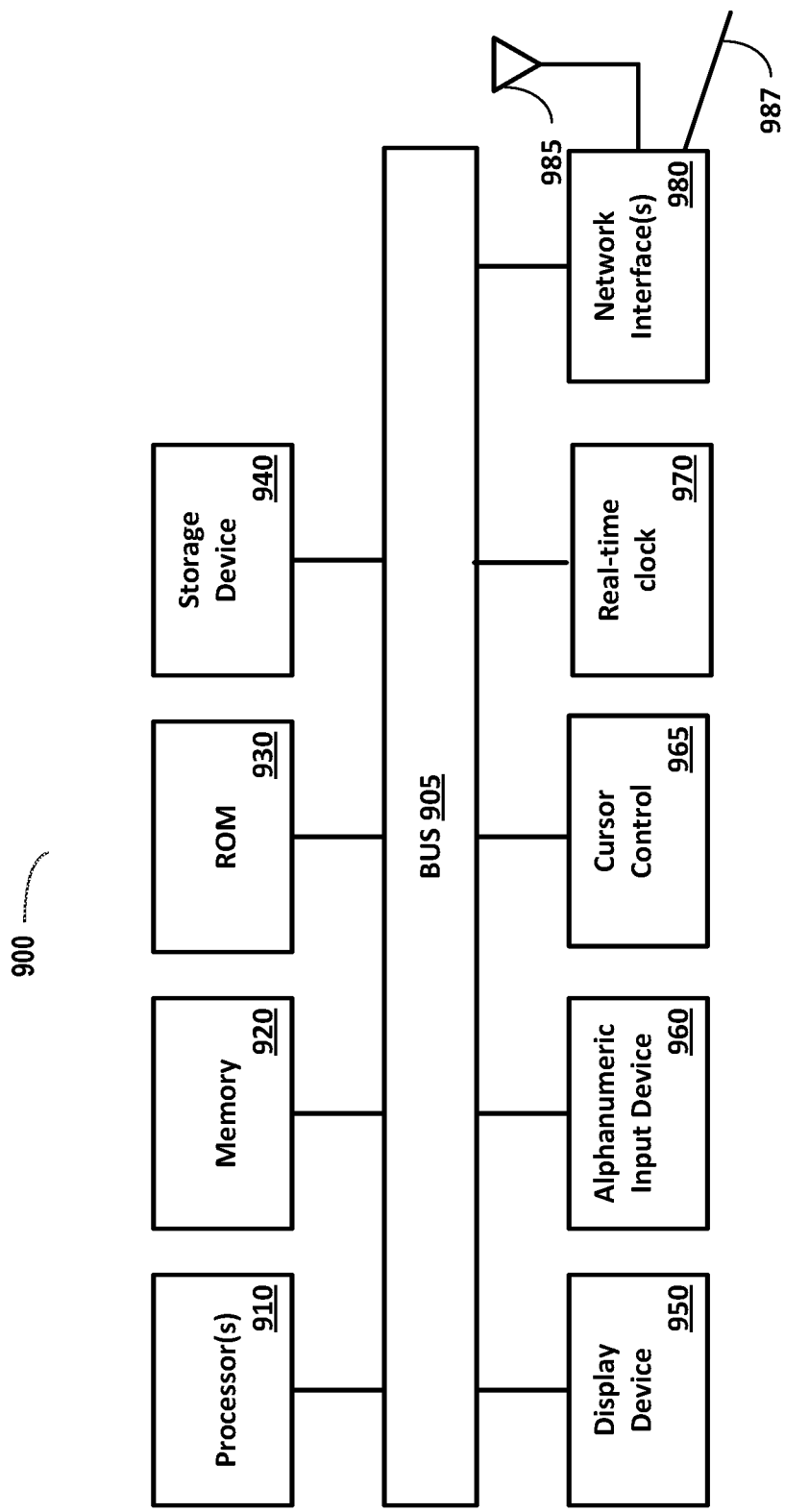
FIG. 9 illustrates an exemplary computing platform for client devices, cluster nodes, and other processing systems that implement the virtual stream functionality disclosed herein, in accordance with some embodiments.

FIG. 9 is a block diagram of one embodiment of a computing system 900 for client devices, streaming service cluster nodes (storage units, back plane, or processing unit), and other processing systems that implement the virtual stream functionality disclosed herein, in accordance with some embodiments. The computing system illustrated in FIG. 9 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 9 may be used to provide a computing device and/or a server device.

Computing system 900 includes bus 905 or other communication device to communicate information, and processor 910 coupled to bus 905 that may process information.

While computing system 900 is illustrated with a single processor, computing system 900 may include multiple processors and/or co-processors 910. Computing system 900 further may include random access memory (RAM) or other dynamic storage device 920 (referred to as main memory), coupled to bus 905 and may store information and instructions that may be executed by processor(s) 910. Main memory 920 may also be used to store temporary variables or other intermediate information during execution of instructions by processor 910.

Computing system 900 may also include read only memory (ROM) 930 and/or other static, non-transitory storage device 940 coupled to bus 905 that may store static information and instructions for processor(s) 910. Data storage device 940 may be coupled to bus 905 to store information and instructions. Data storage device 940 such as flash memory or a magnetic disk or optical disc and corresponding drive may be coupled to computing system 900.

Computing system 900 may also be coupled via bus 905 to display device 950, such as a cathode ray tube (CRT), light-emitting diode display (LED), or liquid crystal display (LCD), to display information to a user. Computing system 900 can also include an alphanumeric input device 960, including alphanumeric and other keys, which may be coupled to bus 905 to communicate information and command selections to processor(s) 910. Another type of user input device is cursor control 965, such as a touchpad, a mouse, a trackball, or cursor direction keys to communicate direction information and command selections to processor(s) 910 and to control cursor movement on display 950. Computing system 900 may further include a real-time clock 970. The real-time clock 970 may be used for generating date/time stamps for data records, computing elapsed time, and other time-keeping functions. A real-time clock 970 can be a battery-backed chipset with a settable date and time. Alternatively, a real-time clock 970 may include logic to retrieve a real-time from a network source such as a server or an Internet server via network interfaces 980, described below.

Computing system 900 further may include one or more network interface(s) 980 to provide access to a network, such as a local area network. Network interface(s) 980 may include, for example, a wireless network interface having antenna 985, which may represent one or more antenna(e). Computing system 900 can include multiple wireless network interfaces such as a combination of WiFi, Bluetooth® and cellular telephony interfaces. Network interface(s) 980 may also include, for example, a wired network interface to communicate with remote devices via network cable 987, which may be, for example, an Ethernet cable, a coaxial cable, a fiber optic cable, a serial cable, or a parallel cable.

In one embodiment, network interface(s) 980 may provide access to a local area network, for example, by conforming to IEEE 802.11b, 802.11g, or 802.11n standards, and/or the wireless network interface may provide access to a personal area network, for example, by conforming to Bluetooth® standards. Other wireless network interfaces and/or protocols can also be supported. In addition to, or instead of, communication via wireless LAN standards, network interface(s) 980 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method performed by a server, comprising:
   determining a plurality of data streams active on the server that match a query received from a client device;
   generating a virtual stream comprising data received from the plurality of data streams;
   transmitting to the client device, a unique identifier identifying the virtual stream and one or more segments of data of the virtual stream;
   detecting that a flow rate of data segments received by the virtual stream has decreased below a first threshold amount;
   notifying the client device to reduce one or more consumers to process the virtual stream; and
   decreasing a number of partitions of the virtual stream by at least one partition, in response to receiving a notice from the client device that the client device has reduced at least one consumer to process the virtual stream.

2. The method of claim 1, further comprising monitoring data streams active on the server.

3. The method of claim 2, further comprising:
   detecting that the server has received an event from a new source stream that matches the query and is not currently a part of the virtual stream; and
   adding the new source stream to the virtual stream.

4. The method of claim 2, further comprising:
   detecting that an existing source stream that is currently a part of the virtual stream is no longer active on the server; and
   deleting the existing source stream from the virtual stream.

5. The method of claim 4, wherein the existing source stream is no longer active if an explicit message is received that the existing source stream is terminating, or the existing the source stream failed to produce a data element within a specified window of time.

6. The method of claim 1, further comprising:
   detecting that a flow rate of data segments received by the virtual stream has increased by a second threshold amount;
   notifying the client device to add one or more consumers for processing the virtual stream; and
   increasing a number of partitions of the virtual stream by at least one less partition, in response to receiving a notice from the client device that the client device has added at least one consumer that processed the virtual stream.

7. A non-transitory machine-readable medium having instructions stored therein, which when executed by a processor, cause the processor to perform operations, the operations comprising:
   determining a plurality of data streams active on the server that match a query received from a client device;
   generating a virtual stream comprising data received from the plurality of data streams;
   transmitting to the client device, a unique identifier identifying the virtual stream and one or more segments of data of the virtual stream;
   detecting that a flow rate of data segments received by the virtual stream has decreased below a first threshold amount;
   notifying the client device to reduce one or more consumers to process the virtual stream; and
   decreasing a number of partitions of the virtual stream by at least one partition, in response to receiving a notice from the client device that the client device has reduced at least one consumer to process the virtual stream.

8. The machine-readable medium of claim 7, wherein the operations further comprise monitoring data streams active on the server.

9. The machine-readable medium of claim 8, wherein the operations further comprise:
   detecting that the server has received an event from a new source stream that matches the query and is not currently a part of the virtual stream; and
   adding the new source stream to the virtual stream.

10. The machine-readable medium of claim 8, wherein the operations further comprise:
    detecting that an existing source stream that is currently a part of the virtual stream is no longer active on the server; and
    deleting the existing source stream from the virtual stream.

11. The machine-readable medium of claim 10, wherein the existing source stream is no longer active if an explicit message is received that the existing source stream is terminating, or the existing the source stream failed to produce a data element within a specified window of time.

12. The machine-readable medium of claim 7, wherein the operations further comprise:
    detecting that a flow rate of data segments received by the virtual stream has increased by a second threshold amount;

notifying the client device to add one or more consumers for processing the virtual stream; and increasing a number of partitions of the virtual stream by at least one less partition, in response to receiving a notice from the client device that the client device has added at least one consumer that processed the virtual stream.

13. A computer-implemented method performed by a server, comprising:

determining a plurality of data streams active on the server that match a query received from a client device;

generating a virtual stream comprising data received from the plurality of data streams;

transmitting to the client device, a unique identifier identifying the virtual stream and one or more segments of data of the virtual stream;

detecting that a flow rate of data segments received by the virtual stream has increased above a first threshold amount;

notifying the client device to add one or more consumers to process the virtual stream; and increasing a number of partitions of the virtual stream by at least one partition, in response to receiving a notice from the client device that the client device has added at least one consumer to process the virtual stream.

14. The method of claim 13, further comprising, monitoring data streams active on the server.

15. The method of claim 14, further comprising:

detecting that the server has received an event from a new source stream that matches the query and is not currently a part of the virtual stream; and adding the new source stream to the virtual stream.

16. The method of claim 14, further comprising:

detecting that an existing source stream that is currently a part of the virtual stream is no longer active on the server; and deleting the existing source stream from the virtual stream.

17. The method of claim 16, wherein the existing source stream is no longer active if: an explicit message is received that the existing source stream is terminating, or the existing the source stream failed to produce a data element within a specified window of time.

18. The method of claim 13, further comprising:

detecting that a flow rate of data segments received by the virtual stream has decreased by a second threshold amount;

notifying the client device to delete one or more consumers for processing the virtual stream; and decreasing a number of partitions of the virtual stream by at least one less partition, in response to receiving a notice from the client device that the client device has deleted at least one consumer that processed the virtual stream.

* * * * *